United States Patent [19]

Crawford et al.

[11] Patent Number: 4,831,528
[45] Date of Patent: May 16, 1989

[54] APPARATUS AND METHOD FOR IMPROVEMENT OF 3D IMAGES DERIVED FROM TOMOGRAPHIC DATA

[75] Inventors: Carl R. Crawford, Milwaukee, Wis.; William E. Lorensen, Ballston Lake, N.Y.

[73] Assignee: General Electric Company, Springfield, N.J.

[21] Appl. No.: 118,628

[22] Filed: Nov. 9, 1987

[51] Int. Cl.$^4$ .......................... G06F 15/42; G09G 1/06
[52] U.S. Cl. .................................. 364/413.22; 340/729
[58] Field of Search ...................... 364/413.22, 413.19, 364/413.13, 522, 413.16; 340/729, 727

[56] References Cited

U.S. PATENT DOCUMENTS

| | | | |
|---|---|---|---|
| 4,002,911 | 1/1977 | Hounsfield | 378/16 |
| 4,692,806 | 9/1987 | Anderson et al. | 358/166 X |
| 4,694,404 | 9/1987 | Meagher | 364/518 |
| 4,697,594 | 10/1987 | Mayo | 358/82 |
| 4,709,231 | 11/1987 | Sakalbara | 340/729 |
| 4,710,876 | 12/1987 | Cline et al. | 340/727 X |
| 4,719,585 | 1/1988 | Cline et al. | 340/729 X |
| 4,737,921 | 4/1988 | Goldwasser et al. | 364/518 |

*Primary Examiner*—Jerry Smith
*Assistant Examiner*—Steven G. Kibby
*Attorney, Agent, or Firm*—Thomas R. Morrison

[57] ABSTRACT

Data in tomographic images is convolved with a low-pass filter to reduce the maximum spatial frequency permitting unique mapping of surface images to a rasterized display. The filter may use linear or other weighting. Re-sampling after the filter is optional. The filtered tomographic data is employed to determine the locations and normal vectors of the surface. The locations and normal vectors employed by a computer graphics processor for applying shading in relation to the angle between the normal vector to a surface element and an operator-defined line of sight to the surface.

10 Claims, 6 Drawing Sheets

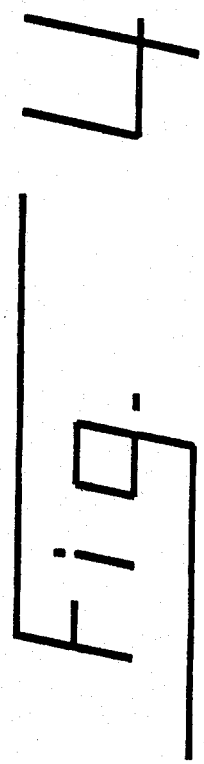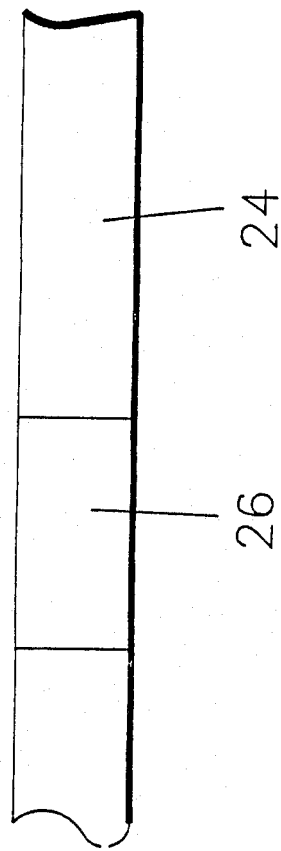

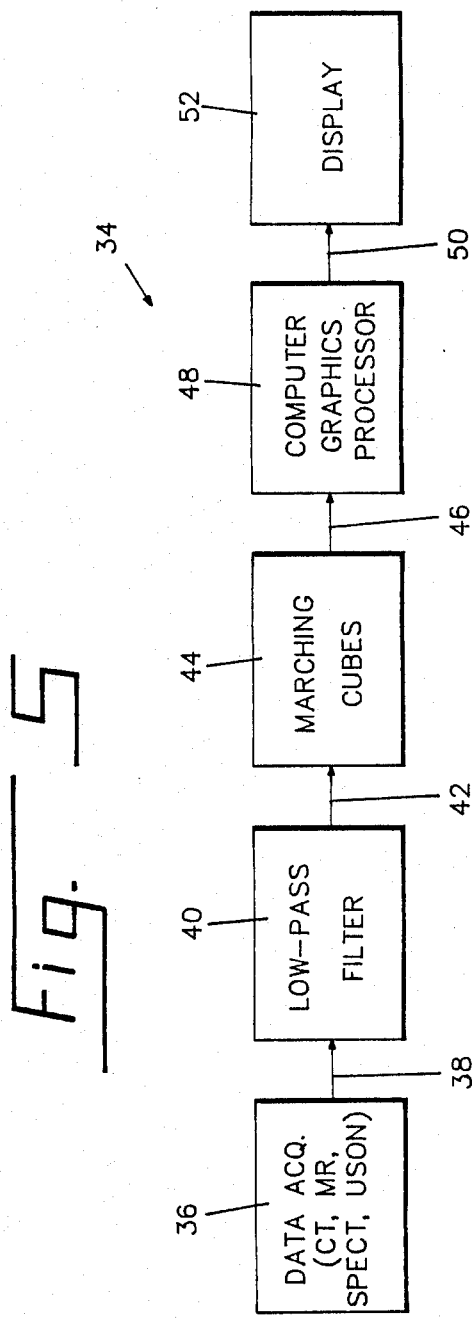

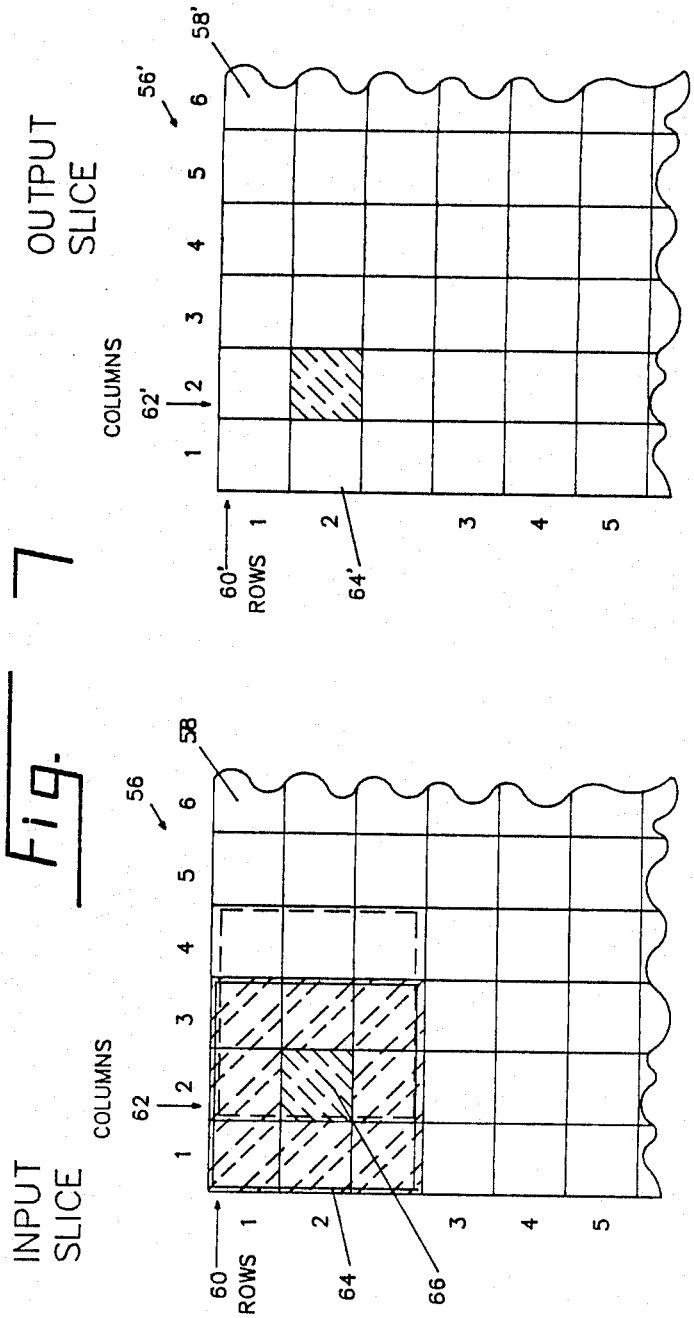

APPARATUS AND METHOD FOR IMPROVEMENT OF 3D IMAGES DERIVED FROM TOMOGRAPHIC DATA

BACKGROUND OF THE INVENTION

Tomographic medical imaging employs the collection of data from a plurality of views of a body. The views are processed mathematically to produce representations of contiguous cross-sectional images. Such cross-sectional images are of great value to the medical diagnostician in a non-invasive investigation of internal body structure. The technique employed to collect the data is a matter of indifference to the present invention. Any technique such as, for example, X-ray computed tomography, nuclear magnetic resonance tomography, single-photon emission tomography, positron emission tomography, or ultrasound tomography may serve equally.

A body to be imaged exists in three dimensions. Tomographic devices process data for presentation as a series of contiguous cross-sectional slices along selectable axes through the body. Each cross sectional slice is made up of a number of rows and columns of voxels (parallelepiped volumes), each represented by a digitally-stored number related to a computed signal intensity in the voxel. In practice, an array of, for example, 64 slices may each contain 512 by 512 voxels. In normal use, a diagnostician reviews images of a number of individual slices to derive the desired information. In cases where information about a surface within the body is desired, the diagnostician relies on inferences of the 3D nature of the object derived from interrogating the cross-sectional slices. At times, it is difficult or impossible to attain the required inference from reviewing contiguous slices. In such cases, a synthesized 3D image would be valuable.

Synthesizing a 3D image from tomographic data is a two-step process. In the first step, a mathematical description of the desired object is extracted from the tomographic data. In the second step, the image is synthesized from the mathematical description.

Dealing with the second step first, assuming that a surface description can be synthesized from knowledge of the slices, the key is to go from the surface to the 3D image. The mathematical description of the object is made up of the union of a large number of surface elements (SURFELS). The surfels are operated on by conventional computer graphics software, having its genesis in computer aided design and computer aided manufacturing, to apply surface shading to objects to aid in image interpretation through a synthesized two-dimensional image. The computer graphics software projects the surfels onto a rasterized image and determines which pixels of the rasterized image are turned on, and with what intensity or color. Generally, the shading is lightest for image elements having surface normals along an operator-selected line of sight and successively darker for those elements inclined to the line of sight. Image elements having surface normals inclined more than 90 degrees from the selected line of sight are hidden in a 3D object and are suppressed from the display. Foreground objects on the line of sight hide background objects. The shading gives a realistic illusion of three dimensions. It is thus apparent that the information provided by the surface normals to the line of sight are very important in producing a realistic 3D image.

Returning now to the problem of extracting a mathematical description of the desired surface from the tomographic slice data, this step is broken down into two subtasks, namely the extraction of the object from the tomographic data, and the fitting of the surface to the extracted object. A number of ways are available to do the first subtask. For example, it is possible to search through the signal intensities in the voxels of a slice to discern regions where the material forming the object has sufficient signal contrast with surrounding regions. For example, signal intensities characteristic of bone in X-ray tomography produce striking contrast with surrounding tissue. A threshold may then be applied to the voxels to identify each one in the complete array lying in the desired object from all not in the object.

Advancing to the second subtask, there are also a number of ways to fit the surface to the extracted object. Work has been done, for example, by Gabor Herman on a method in which each voxel is analyzed to determine whether or not it belongs to the desired object. If it does belong to the object, six rectangular surfels, along with their surface normals, representing the six surfaces of the voxel, are derived for input to computer graphics software. At least partly due to the differences between normals to the actual surface and the normals derived from the orientations of the surfaces of the voxels, this technique produces images of relatively low quality.

A method, called the marching cubes method, disclosed in U.S. Pat. No. 4,710,876, filed June 5, 1985, which has been allowed, overcomes many of the drawbacks of the above-mentioned prior work. The disclosure of this referenced patent is herein incorporated by reference. In this technique, signal values in eight cubically adjacent voxels in the tomographic array are examined for those having a specified relationship to a selected threshold value. When the relationship is found, a binary vector is generated characterizing the manner in which the surface of the object passes through the volume defined by the eight cubically adjacent voxels. Up to four triangular surface elements may be defined in such a volume. Normal vectors to the all surface elements thus discovered are input to computer graphics software for display of a shaded 3D image.

The marching cubes method is successful in improving the 3D representation of objects derived from tomographic data. It is believed that the 3D image quality produced by surface data calculated from the marching cubes method is improved because the surface normals to the image thus derived are equal to the normalized 3D gradient of the original tomographic data.

A further technique, called the dividing cubes method, for deriving surface data is disclosed in U.S. Pat. No. 4,719,585, filed Aug. 28, 1985. The disclosure of this referenced patent is herein incorporated by reference. The dividing cubes method divides the voxel in the tomographic array to values which the computer graphics software can treat as a point for scan conversion onto the raster scan of the 3D image. Surface normals to each point are derived from the normalized gradients of the tomographic data.

The marching cubes and dividing cubes methods produce an imaging artifact to which the present invention is addressed. A mismatch exists between the data available from the marching cubes or dividing cubes method and the data that can be handled by the conventional computer graphics software and hardware. This mismatch is triggered by the disparity between the number of row or columns in a slice (generally equal) and the number of slices. At some places on a rasterized 3D image, the method may define more than one surface element for mapping onto the same pixel in the image. The conflicting surface normals may point in different directions. The computer graphics software, without information to guide it, selects one of the surface normals to apply shading in that location, whether it is correct or not. It has been discovered that this effect produces ring-type artifacts at the top of a 3D image of the human skull.

OBJECTS AND SUMMARY OF THE INVENTION

It is an object of the invention to provide a technique capable of overcoming the drawbacks of the prior art.

It is a further object of the invention to provide a method and apparatus for adjusting a spatial frequency of a tomographic image to eliminate an artifact of a 3D image generated by a marching cubes method.

It is a further object of the invention to provide a method and apparatus for adjusting a spatial frequency of a tomographic image to eliminate an artifact of a 3D image generated by a dividing cubes method.

It is a still further object of the invention to provide a method and apparatus for convolving tomographic image with a low-pass filter to remove artifacts from a 3D image derived therefrom.

Briefly stated, the present invention provides a display system in which data in tomographic images is convolved with a low-pass filter to reduce the maximum spatial frequency permitting unique mapping of surface images to a rasterized display. The filter may use linear or other weighting. Re-sampling after the filter is optional. The filtered tomographic data is employed to determine the locations and normal vectors of the surface. The locations and normal vector are employed by a computer graphics processor for applying shading in relation to the angle between the normal vector to a surface element and an operator-defined line of sight to the surface.

According to an embodiment of the invention, there is provided an imaging system comprising: means for deriving a mathematical description of a surface of an object from a plurality of slices of tomographic data, a computer graphics processor, the computer graphics processor including means for projecting the surface onto a shaded rasterized two-dimensional image, means for displaying the two-dimensional image, means for convolving the tomographic data with a low-pass filter, and the low-pass filter having a characteristic effective for reducing a maximum spatial frequency in the tomographic data to a value permitting no more than one surface element of the surface to be projected to one pixel in the rasterized two-dimensional image.

According to a feature of the invention, there is provided a method for synthesizing an image comprising: deriving a mathematical description of a surface of an object from a plurality of slices of tomographic data, projecting the surface onto a shaded rasterized two-dimensional image, displaying the two-dimensional image, convolving the tomographic data with a low-pass filter, and the low-pass filter including a characteristic effective for reducing a maximum spatial frequency in the tomographic data to a value permitting no more than one surface element of the surface to be projected to one pixel in the rasterized two-dimensional image.

According to a further feature of the invention, there is provided an imaging system comprising: means for deriving a mathematical description of a surface of an object from a plurality of slices of tomographic data, means for projecting the surface onto a shaded rasterized two-dimensional image, means for convolving the tomographic data with a low-pass filter, and the low-pass filter having a characteristic effective for reducing a maximum spatial frequency in the tomographic data to a value permitting no more than one surface element of the surface to be projected to one pixel in the rasterized two-dimensional image.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 is a portion of a scan line of a raster display showing a displayed pixel and a plurality of possible vector directions competing for display thereon.

FIG. 5 is a simplified block diagram of a tomographic surface imaging system according to an embodiment of the invention.

FIG. 7 is a close-up view of a tomographic slice illustrating one convolution technique according to the invention.

DETAILED DESCRIPTION OF THE PREFERRED EMBODIMENT

The following description employs the marching cubes method for deriving a surface description of an object from tomographic image data. This selection is for concreteness and should not be seen as limiting the invention. Other methods such as, for example, the dividing cubed method may equally serve as part of the environment for the present invention without departing from the spirit and scope thereof.

Figure 1:
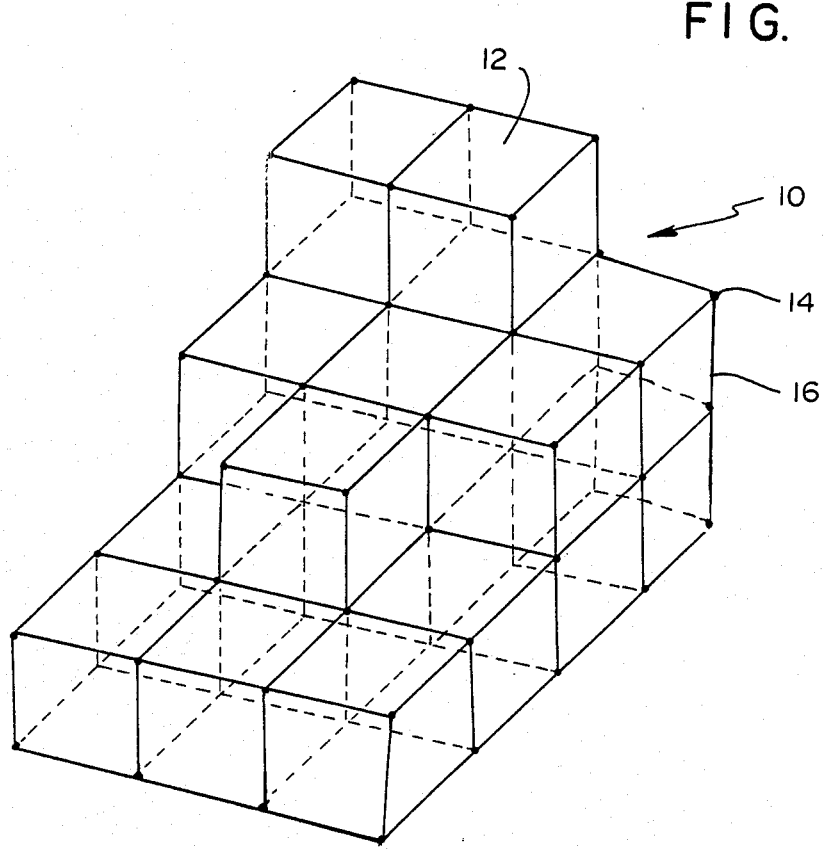
FIG. 1 is an array of tomographic data to which reference will be made of the manner in which surface elements are defined in the present invention.

Referring to FIG. 1, there is shown, generally at 10, a part of a tomographic array consisting of a cubic array of cubes 12 defined by nodes 14 connected by edges 16. Each node 14 represents a signal amplitude of a voxel of tomographic data and each edge 16 represents the distance from one voxel to its neighbor.

Figure 2:
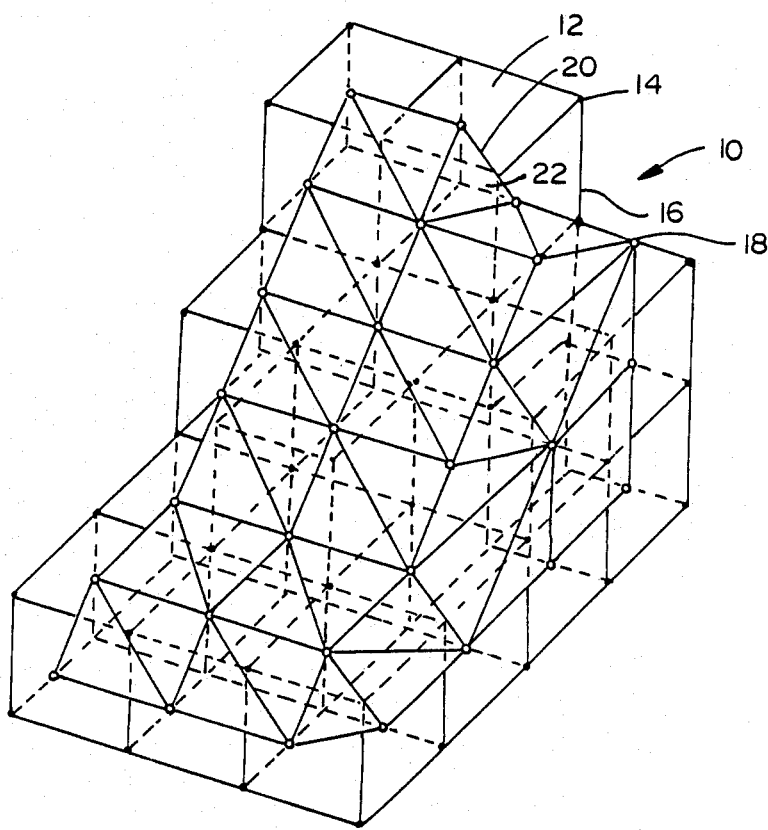
FIG. 2 is the array of FIG. 1 wherein intersections of polygonal planes defining the desired surface with sides of the elements of the array are indicated.

Referring now to FIG. 2, to find an object within tomographic array 10, each node 14 is tested for its relationship to a selected threshold value to determine whether it is above or below the threshold. Then, if two adjacent nodes 14 are found with one node 14 above, and the other below, the threshold, the surface of the object must intersect edge 16 somewhere between them at a distance which can be scaled according to the relative signal values. Such intersections 18 are shown as open circles. Lines 20 joining intersections 18 within a cube 12 define a polygonal surface 22. The marching cubes method describes the manner in which lines 20 may be identified. Each polygonal surface 22 is characterized by its intersections 18 and a unit vector directed normal to polygonal surface 22.

Figure 3:
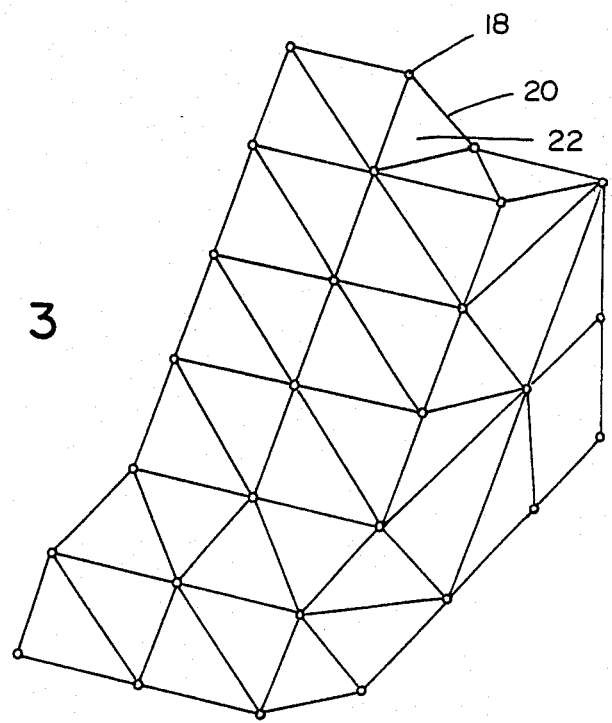
FIG. 3 is a surface derived from the polygonal planes of FIG. 2.

Referring now also to FIG. 3, the array of polygonal surfaces 22, isolated from the remainder of tomographic array 10, together with their coordinates and normal vectors, are applied to conventional computer graphics software for shading and display.

Referring now to FIG. 4, a portion of a line 24 of a conventional rasterized display (not otherwise shown) includes a pixel 26 onto which one element of the 3D surface is to be projected by the computer graphics software. Due to the above-mentioned mismatch between the number of rows or columns in each slice and the number of slices, it is possible that more than one surface element, represented by surface normal vectors 28, 30 and 32, may require projection onto pixel 26. As previously mentioned, the shading (darkness or color) of pixel 26 is adjusted according to the angular relationship between the surface normal of an element and a selected line of sight. With three surface normal vectors, all pointed in different directions, the shading applied to pixel 26 depends critically on which of surface normal vectors 28, 30 and 32 is selected for controlling the shading of pixel 26. As previously noted, failure to select the correct one produces artifacts in the displayed image.

Referring to FIG. 5, there is shown, generally at 34, a tomographic imaging system according to an embodiment of the invention. A data acquisition system 36 obtains and processes raw data to produce tomographic slice data for application on a line 38 to a low-pass filter 40. Data acquisition system 36 may be of any convenient type. The filtered row and column data from low-pass filter 40 is applied on a line 42 to a marching cubes processor 44. Marching cubes processor 44 calculates the surface coordinates and surface normal vectors as previously described and applies the result on a line 46 to a computer graphics processor 48. As is conventional, computer graphics processor 48 calculates and applies shading to the 3D surface according to the inclination of the surface normal vectors at each displayed element of the surface. The resulting shaded video is applied on a line 50 to a conventional display 52.

The spatial frequency of row and column data from data acquisition system 36 is reduced in low-pass filter 40 to a value such that each surface element derived by marching cubes processor 44 generally projects to one, and only one, position on display 52. That is, the maximum spatial frequency of the tomographic data is reduced to a value permitting no more than one surface element to be projected to one pixel in the rasterized image. Thus, the artifacts previously generated by a computer graphics system employing marching cubes is eliminated. Since the spatial frequency in the output of low-pass filter 40 substantially matches the ability of the computer graphics system to display the 3D image, no resolution is lost in the process. Any greater spatial frequency would not enhance the image but, as described in the preceding, can create imaging artifacts which interfere with image interpretation.

Figure 6:
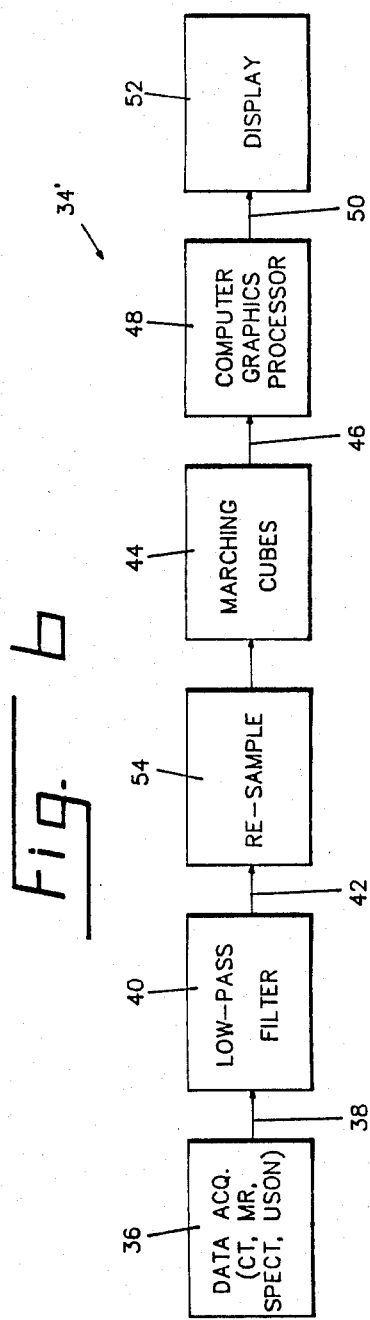
FIG. 6 is a simplified block diagram of a tomographic ,surface imaging system according to a further embodiment of the invention.

Referring now to FIG. 6, a tomographic imaging system 34' is the same as that in FIG. 5 except for the addition of a re-sampler 54 interposed between low-pass filter 40 and marching cubes processor 44. We have discovered that, in most cases, re-sampler 54 is not required, but disclosure of it is included here for completeness.

The slice data on line 38 is conveniently in digital form. Accordingly, low-pass filter 40 is preferably a digital filter capable of convolving the slice data with a filter to reduce the spatial frequency in its output. We have discovered that the resulting improvement is relatively insensitive to the nature of the filter and to the manner in which filtering is performed.

Referring now to FIG. 7, a technique is shown for reducing the spatial frequency of an image using a low-pass filter. Tomographic slice 56 consists of a plurality of voxel 58 arranged in a rectangular array of rows 60 and columns 62. Each voxel 58 is a digital value representing a brightness, or other characteristic, of its location in tomographic slice 56. The values of all voxels 58 within a window 64 are summed in a predetermined manner to derive an output value for a center voxel 66. The output value becomes the value of a voxel 58' in an output tomographic slice 56' having a position corresponding to the center voxel in window 64. Then, window 64 is stepped a predetermined number of voxels 58 and the process is repeated to determine the output value for the center voxel then within window 64.

In the illustrative example in FIG. 7, window 64 is square with three voxels 58 on a side. In a first position of window 64, shown in solid line, the value of voxel 58' in output tomographic slice 56', in a position corresponding to voxel 58 in row 2 and column 2 of tomographic slice 56, is evaluated by summing the values of voxels 58 in rows 1-3 and columns 1-3. The sum is then normalized and the result is ascribed to the row-2 column-2 voxel 58' in output tomographic slice 56'. Next, window 64 is stepped one voxel 58 to right and the process is repeated to evaluate the output voxel 58' at row 2, column 3. Upon completion of the convolution of the entire tomographic slice 56, output tomographic slice 56' contains the same number of voxels 58', but with a spatial frequency reduced in accordance with the size of window 64 and the weighting applied to the values of surrounding voxels 58.

In one embodiment of the invention, linear weighting is employed. That is, the values of all nine voxels 58 in window 64 are summed and the result divided by 9 to produce the final value for the voxel 58 being calculated. Other window sizes and weighting functions could be applied and would have predictable effects on the spatial frequency of the result. For example, the values of voxels 58 outside the central voxel 58 may be weighted with a Gaussian, exponential or triangular function depending upon its distance along a row or column from the central voxel 58. Alternatively, weighting may be applied according to the diagonal distance between voxels 58. As noted above, we have found the choice of a particular weighting function, as long as it approximates a low-pass filter, has little effect on the displayed 3D image.

One skilled in the art, having the present specification for reference, would be fully enabled to identify the filter characteristic desired for a particular application.

Performing the convolution in the manner detailed above requires $M 2 \times N 2$ computations, where M is the row or column dimension of window 64 and N is the number of rows or columns in tomographic slice 56 (assuming equal numbers of rows and columns). We have discovered that comparable results can be achieved, with a reduction in computations to $2 \times (N 2 \times M)$ by first convolving the rows and then convolving the columns in each slice. That is, the size of window 64 is reduced to one voxel high by three voxels long. The values of all voxels 58 are then evaluated in a first pass moving along rows 60. The resulting values are then further modified using a window 64 one voxel wide by three voxels high, with motion in vertical steps along columns 62.

We have found that display of the resulting filtered data can be performed without requiring re-sampling. However, it will be recognized that the spatial frequency of the filtered data is reduced by the amount determined by the filter response. If, for example, the original maximum spatial frequency was 10 KHz and the spatial frequency was reduced by a factor of two by the filter, the maximum spatial frequency in the filtered data is reduced to 5 KHz. Whereas the original sampling frequency to capture data up to 10 KHz is 20 KHz. For example, if it is desired to resample data originally sampled at twice the new sampling frequency, such resampling can be done by discarding every second data item, without destroying data in the result.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What we claim is:

1. An imaging system comprising:
   means for deriving a mathematical description of a surface of an object from a plurality of slices of tomographic data;
   a computer graphics processor;
   said computer graphics processor including means for projecting said surface onto a shaded rasterized two-dimensional image;
   means for displaying said two-dimensional image;
   means for convolving said tomographic data with a low-pass filter; and
   said low-pass filter having a characteristic effective for reducing a maximum spatial frequency in said tomographic data to a value permitting no more than one surface element of said surface to be projected to one pixel in said rasterized two-dimensional image.

2. An imaging system according to claim 1, wherein said means for deriving a mathematical description includes means for employing a marching cubes method.

3. An imaging system according to claim 1, wherein said means for deriving a mathematical description includes means for employing a dividing cubes method.

4. An imaging system according to claim 1 wherein said characteristic includes a linear characteristic.

5. An imaging system according to claim 1 wherein said characteristic includes a gaussian characteristic.

6. An imaging system according to claim 1, wherein said means for convolving includes:
   means for inputting at least one input slice of tomographic data;
   means for outputting an output slice of tomographic data derived from said input slice; and
   means for assigning a value to each pixel of said output slice derived from a first weighted value of a corresponding voxel of said input slice, plus second weighted values of a predetermined neighborhood of voxels in said input slice.

7. An imaging system according to claim 6 wherein weights in deriving said first and second weighted values are equal.

8. An imaging system according to claim 6 wherein weights in deriving said first and second weighted values are related by a non-linear function.

9. A method for synthesizing an image comprising:
   deriving a mathematical description of a surface of an object from a plurality of slices of tomographic data;
   projecting said surface onto a shaded rasterized two-dimensional image;
   displaying said two-dimensional image;
   convolving said tomographic data with a low-pass filter; and
   providing said low-pass filter with a characteristic effective for reducing a maximum spatial frequency in said tomographic data to a value permitting no more than one surface element of said surface to be projected to one pixel in said rasterized two-dimensional image.

10. An imaging system comprising:
    means for deriving a mathematical description of a surface of an object from a plurality of slices of tomographic data;
    means for projecting said surface onto a shaded rasterized two-dimensional image;
    means for convolving said tomograhic data with a low-pass filter; and
    said low-pass filter having a characteristic effective for reducing a maximum spatial frequency in said tomographic data to a value permitting no more than one surface element of said surface to be projected to one pixel in said rasterized two-dimensional image.

* * * * *

UNITED STATES PATENT AND TRADEMARK OFFICE
CERTIFICATE OF CORRECTION

PATENT NO. : 4,831,528

DATED : May 16, 1989

INVENTOR(S) : Carl R. Crawford and William E. Lorensen

It is certified that error appears in the above-identified patent and that said Letters Patent is hereby corrected as shown below:

Col. 6, line 62, the equation "M  2XN  2" should read --$M^2XN^2$--.

Col. 6, line 68, the equation "2X(N  2XM)" should read --$2X(N^2XM)$--.

Signed and Sealed this

Twentieth Day of November, 1990

Attest:

HARRY F. MANBECK, JR.

Attesting Officer

Commissioner of Patents and Trademarks